March 20, 1934.  R. C. VAN NOY  1,952,022
SUPPLY CONTROL FOR GREASING RACKS
Filed Nov. 16, 1931
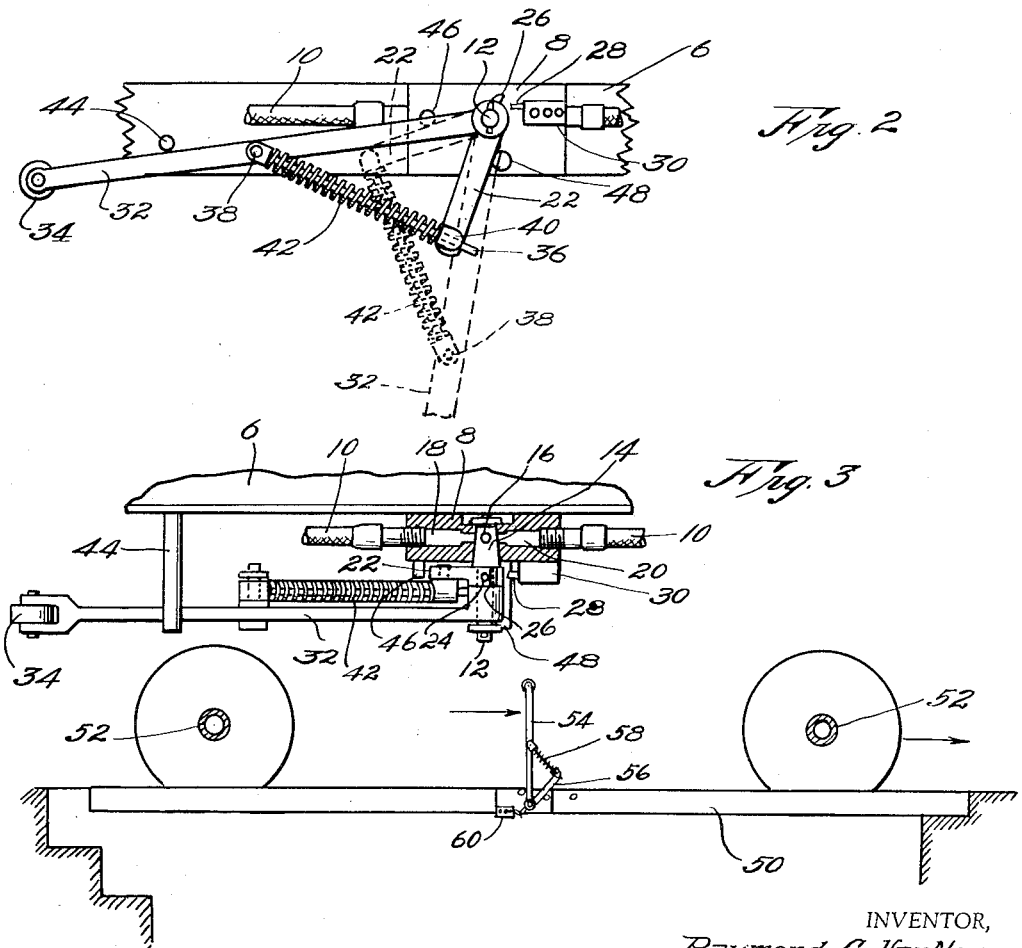
INVENTOR,
Raymond C. VanNoy
BY
Hovey & Hamilton,
ATTORNEYS.

Patented Mar. 20, 1934

1,952,022

UNITED STATES PATENT OFFICE 1,952,022

SUPPLY CONTROL FOR GREASING RACKS

Raymond C. Van Noy, Kansas City, Mo., assignor of forty-nine per cent to Moss H. Silverforb, Kansas City, Mo.

Application November 16, 1931, Serial No. 575,491

3 Claims. (Cl. 184—1)

This invention relates to automobile servicing equipment and particularly to improvements in greasing racks for automobiles and has for a primary object the provision of means combinable with the grease supply valve of a greasing rack which renders the valve incapable of supplying grease when the automobile or rack is moved from the greasing position.

Another object of this invention is to provide a supply control and register for greasing racks which is moved from one extreme position to another when the automobile or grease rack is moved to a position where it is impracticable, if not impossible, to perform the duty of greasing said automobile.

A still further object of this invention is the contemplation of improvements in greasing apparatus in the form of means for denoting the number of times said apparatus has been moved to an operative position.

It is known in this art that when a supply of grease is used for the greasing of automobiles no means is available whereby the number of automobiles actually greased by said supply is determined. A given amount of grease is usually allowed for lubricating one automobile and if the attendant fails to use said given quantity, it is possible to grease more automobiles than would be normally expected.

In view of the above, therefore, it is desirable to provide means combinable with a greasing rack which not only indicates the number of times the grease supply valve has been opened, but releasably maintains the grease supply valve in a closed position until the greasing rack has been raised to a point where the automobile thereon may be lubricated through the use of grease passing through said valve.

While apparatus embodying this invention might be utilized in connection with most any type of greasing rack, the same is best applicable to vertically reciprocating racks which lift the automobile to a point where the operator can manipulate the greasing nozzle while standing beneath the rack.

In the drawing,

Figure 1 is a side elevation of a vertically movable greasing rack equipped with apparatus embodying the features of this invention.

Fig. 2 is an enlarged side elevation of the valve actuating apparatus illustrating the same in two extreme positions.

Fig. 3 is a top plan view of the apparatus shown in Fig. 2, and,

Fig. 4 is a side elevation of a modified form of apparatus wherein is embodied the features of the present invention.

Referring at this time to Figs. 1, 2 and 3, the numeral 6 indicates a vertically reciprocable greasing rack which is moved to and from an elevated position through the well known medium now commonly used. When rack 6 is in a position to receive an automobile, the same is normally in a lowered position, as illustrated in dotted lines of Fig. 1. When greasing rack 6 and the automobile to be lubricated is in the elevated position shown in solid lines of Fig. 1 and it is desired to grease the automobile, there should be an unrestricted flow of grease under pressure through the hereinafter described line and valve. This is accomplished by the attendant manually manipulating lever 32 to the position shown in full lines of Fig. 1. When the rack is lowered, this later described valve is closed.

A valve 8 is associated with greasing rack 6 and forms an interruption in the grease supply line 10 which connects a source of supply with the well known grease gun or other applying equipment. In the preferred form of this invention valve 8 is attached to rack 6 and travels therewith.

Valve 8 is of the ordinary well known construction and includes a rotatable shaft 12 which projects outwardly from the ordinary cross bored member 14, through which passes the supply of grease when bore 16 forms a continuous passage by being moved into alinement with ducts 18 and 20 formed on each side respectively thereof and joined by line 10. This ordinary valve has associated therewith an arm 22 which must be rigidly secured to shaft 12 through the medium of a pin or analogous means 24, whereby the movement of arm 22 will cause rotation of shaft 12 to open and close valve 8. A projecting lug 26 is formed integrally with arm 22 and as valve 8 is opened by moving said arm 22, the projecting member 28 of an ordinary counter 30 is moved to indicate the valve 8 has been opened once.

Lever 32 is mounted for free rotation upon shaft 12 adjacent arm 22 and, as illustrated in Figs. 2 and 3, is appreciably longer than arm 22 and has a roller 34 supported by the free end thereof. One of the salient features of this apparatus is the ability of the same to be yieldably maintained at either end respectively of its path of travel which opens or closes valve 8. This ability is made possible through the use of the rod and spring interconnection between arm 22 and lever 32. One end of rod 36 is pivotally affixed as at 38 to lever 32 while the portion thereof adjacent the opposite end is slidably engaged by outstanding head 40 rotatably carried by arm 22. Spring 42 coiled about rod 36 exerts pressure against lever 32 and arm 22 to force the same apart insofar as it is possible. Thus when lever 32 and arm 22 are in a relative position as illustrated in Fig. 2, yieldable pressure against arm 22 is exerted thereon by spring 42 which in turn is permitted to so function by a positive stop 44, against which lever 32 rests. When the parts of the apparatus are in this position valve 8 is closed and no grease can pass through line 10.

Reference to Fig. 1 readily teaches that lever 32 is carried to this valve-closing position when its roller 34 rides along the floor. Assuming that an automobile has been driven onto rack 6, the next move is to raise rack 6 the desired height. When this has been done, it is desired to have grease available to apply and this is made possible by the manual manipulation of lever 32 to the position shown in solid lines of Fig. 1. This position is likewise shown in dotted lines of Fig. 2 and it is obvious that when lever 32 has been pulled down, pivotal connection 38 will swing about an arc having its center at shaft 12 to a point where spring 42 forces arm 22 up to the dotted position. In this movement counter 30 is operated and a record is made which practically requires the attendant to use the necessary amount of grease in lubricating the automobile now supported by rack 6. The automobile cannot be removed from rack 6 until the same is lowered and rack 6 cannot be lowered without moving the valve-closing apparatus to a position shown in dotted lines of Fig. 1. Stops 46 and 48 are provided to limit the movement of arm 22 while stops 44 and 48 limit the movement of arm 32. If desired, the entire apparatus may be housed in any suitable manner.

This invention might well be incorporated in another type of greasing rack such as shown in Fig. 4. In this instance the rack is of the pit type and the runway supports 50 for the automobile 52 carry a lever 54 similar to the operating lever 32 shown in Figs. 1, 2 and 3. An arm 56 is associated with lever 54 and a connection 58 is set up therebetween for the purpose hereinbefore mentioned. A counter 60 operates when the supply valve is opened. This recording act may take place upon movement of lever 54 in either direction. The vertical position of lever 54 indicates that the supply valve is open and it is obvious that the automobile 52 cannot be removed from the rack without striking lever 54 and moving it down to a point where the apparatus acts to close the supply valve.

A large number of modified forms of the invention might be shown and described. The combination of apparatus of this character with a greasing rack is novel and exceptionally advantageous. The specific structure might be altered without departing from the spirit of the invention or scope of the appended claims.

Having thus described the invention, what is desired to be secured by Letters Patent is:

1. The combination with a vertically reciprocating greasing rack positioned above a foundation and having a grease supply valve carried thereby, of apparatus operable by contacting said foundation for closing said valve as said rack is moving to the lowered position; and means forming a part of said apparatus to yieldably maintain said valve in the fully opened or closed position.

2. A supply control for greasing racks having vertically adjustable runways comprising a grease supply valve carried by said rack; an arm carried by said valve; and an operating lever pivotally mounted and associated with said arm operable to move the same to open and close said valve, said lever being pivotally mounted to oscillate below said runway in a vertical plane whereby movement thereof to open said valve is precluded when said rack is in the lowered position.

3. The combination with a grease rack mounted for vertical adjustment to and from a foundation, of a grease supply valve carried by said rack and a valve operating lever adapted to oscillate to a downwardly depending position to open said valve and being so positioned relative to the foundation when the rack is in the lowered position as to preclude oscillation thereof to open said valve.

RAYMOND C. VAN NOY.